Figure 1:
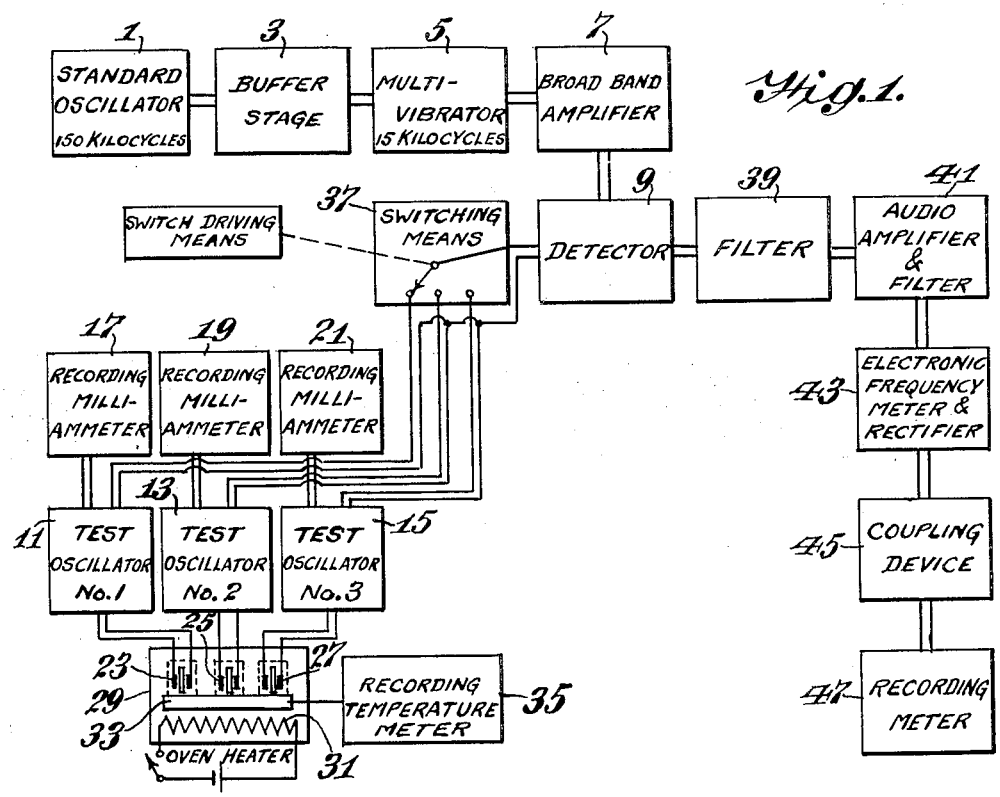

Oct. 31, 1939.    W. F. DIEHL ET AL    2,178,225
METHOD OF AND APPARATUS FOR CALIBRATING PIEZOELECTRIC ELEMENTS
Filed Nov. 27, 1936    4 Sheets-Sheet 1

Inventor
William F. Diehl
and Herbert A. Clarke,
By
Attorney

Oct. 31, 1939.    W. F. DIEHL ET AL    2,178,225
METHOD OF AND APPARATUS FOR CALIBRATING PIEZOELECTRIC ELEMENTS
Filed Nov. 27, 1936    4 Sheets-Sheet 2
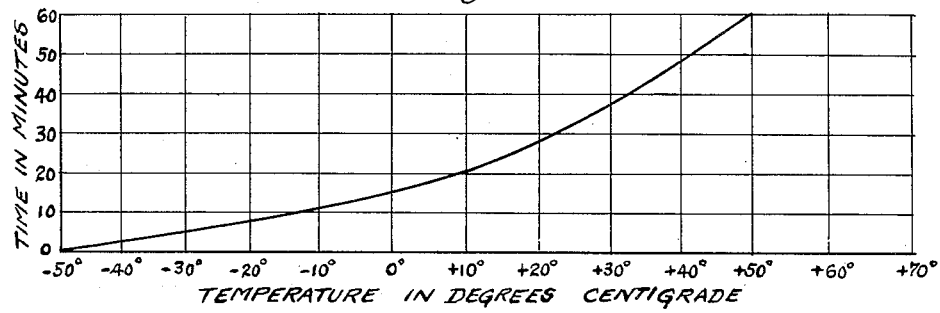
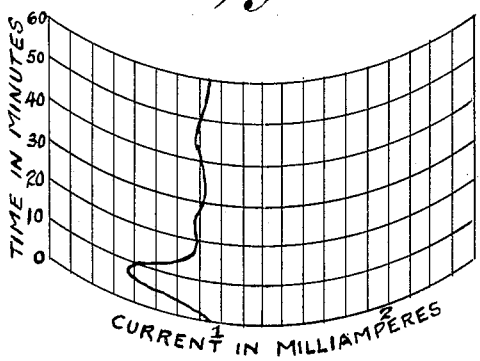
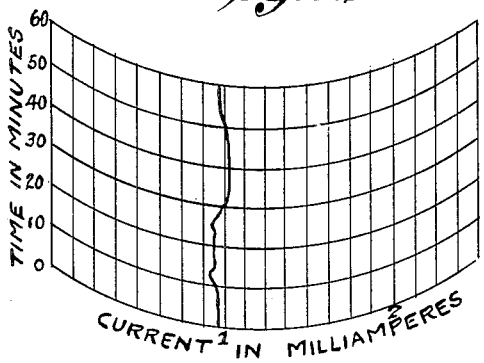
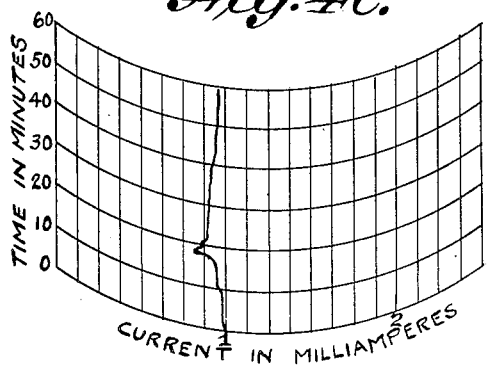
Inventor
William F. Diehl
and Herbert A. Clarke,
By
Attorney

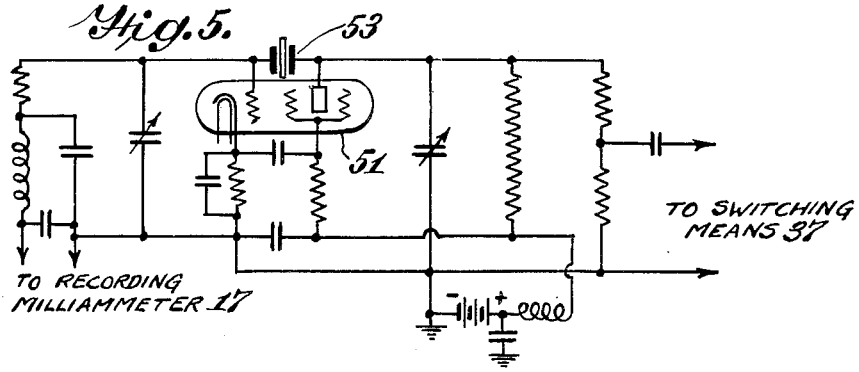
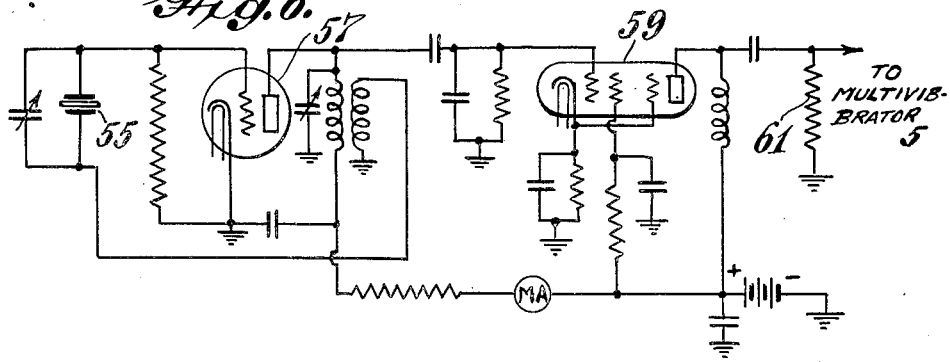
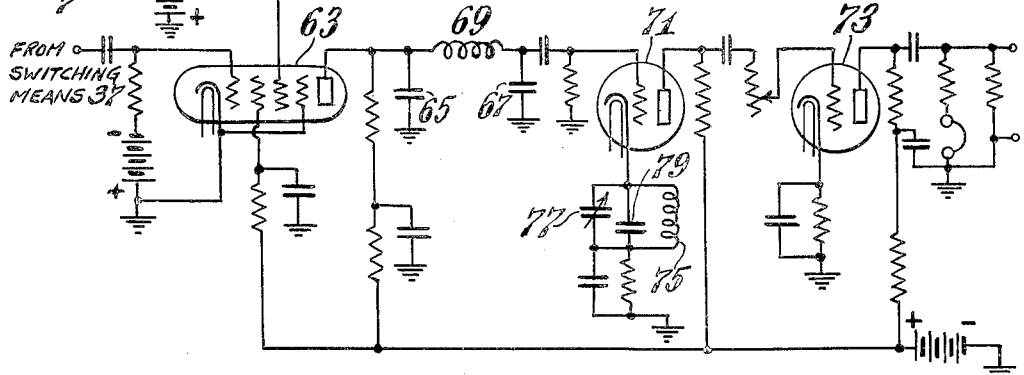

Patented Oct. 31, 1939

2,178,225

UNITED STATES PATENT OFFICE 2,178,225

METHOD OF AND APPARATUS FOR CALIBRATING PIEZOELECTRIC ELEMENTS

William F. Diehl, Haddonfield, N. J., and Herbert A. Clarke, Philadelphia, Pa., assignors to Radio Corporation of America, a corporation of Delaware Application November 27, 1936, Serial No. 113,044

10 Claims. (Cl. 175—183)

Our invention relates to a method of and means for automatically exhibiting the frequency of oscillation of a piezoelectric element or elements as a function of the temperature of the element or elements.

We are aware that oscillators, controlled by piezoelectric elements, have a frequency of oscillation which varies as a function of the ambient temperature of such elements. Prior to our invention it has been the custom to observe and record the frequency of oscillation of a piezoelectric crystal as a function of the crystal temperature, and to plot these recordings as a graph showing frequency, or deviation in frequency, as a function of crystal temperature. The observations for such recordings and the making of these graphs is a laborious task which may require several hours for recording the characteristics of a single crystal.

Our invention contemplates automatically raising the temperature of a plurality of piezoelectric crystals from minus 50 degrees centigrade to plus 50 degrees centigrade, continuously recording said temperature, graphically indicating at frequent intervals the deviation in frequency of each of said crystals which are connected to oscillators, as compared to a standard oscillatory frequency, and continuously recording the grid current of each of said oscillators.

One of the objects of our invention is to provide means for automatically and graphically exhibiting the deviation in frequency of a piezoelectric crystal oscillator as a function of the temperature of the crystal.

Another object is to provide means for graphically illustrating the frequency characteristics of a plurality of piezo-electric elements as a function of temperature and for simultaneously recording the current drawn by the several elements.

A further object is to provide means whereby the deviation in frequency of a number of test piezo-electric oscillators, oscillating at any of a number of widely different frequencies, may be exhibited in terms of cycles per second, as compared to the fundamental or harmonic oscillation of a frequency standard.

A still further object is to provide means for converting the beat frequency currents, generated by the interaction of the oscillatory currents of a standard oscillator and test oscillator, into currents of a form suitable for operating a conventional recording meter.

Figure 2:
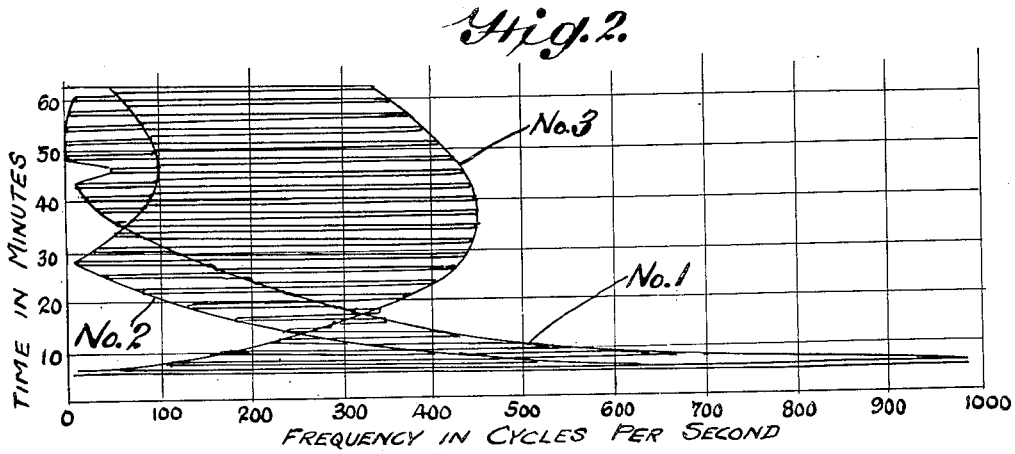
Figure 8:
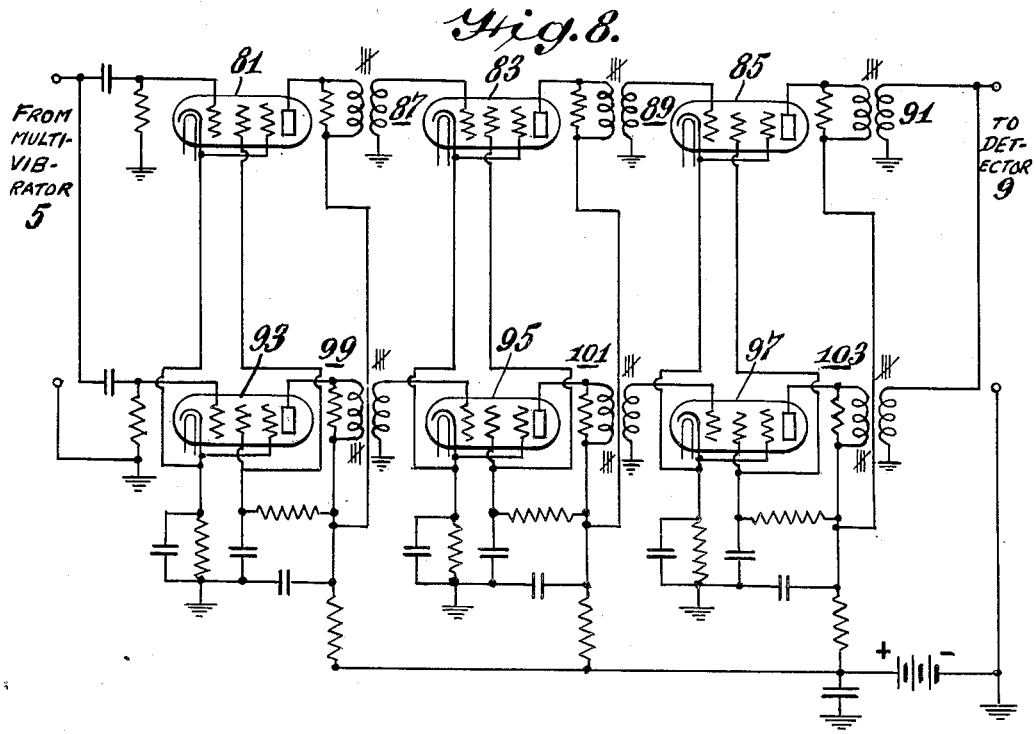
Figure 9:
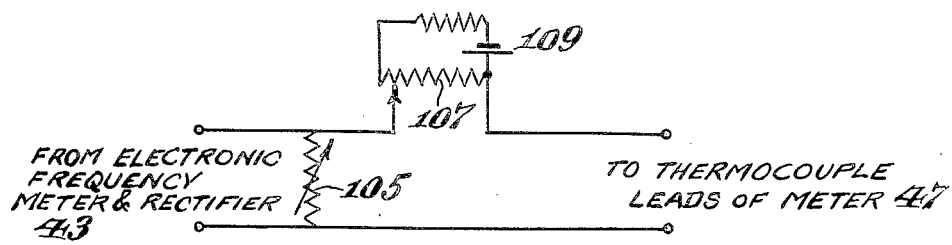

Our invention may be best understood by reference to the accompanying drawings, in which Fig. 1 is a schematic illustration of one embodiment of our invention, Fig. 2 is a reproduction of a graphic exhibition of the frequency characteristics of three piezo-electric oscillators, Fig. 3 is a reproduction of an automatic recording of the temperatures at which the three crystals of Fig. 2 were operated, Figs. 4A, 4B and 4C are reproductions of an automatic recording of the rectified grid current drawn by the three crystal oscillators during the recordings of frequency as a function of temperature as shown in Fig. 2, Fig. 5 is a circuit diagram of a test oscillator, Fig. 6 is a circuit diagram of a standard oscillator and buffer stage, Fig. 7 is a circuit diagram of a detector, filter, and audio frequency amplifier including a filter, Fig. 8 is a circuit diagram of a broad band amplifier, and Fig. 9 is a circuit diagram of a coupling device.

Referring to Fig. 1, a standard oscillator 1 is connected through a buffer stage 3 to a multivibrator 5. The output circuit of the multivibrator 5 is connected to a broad band amplifier 7. The output of the amplifier 7 is impressed on a detector 9, mixing tube, or the like. A plurality of test oscillators 11, 13, 15 are arranged with recording milliammeters 17, 19, 21 and piezo-electric crystals 23, 25, 27 suitably connected, as will be hereinafter described.

The crystals 23, 25, 27 are located within an oven 29, which may be heated by an electric heater 31 or the like. The crystals 23, 25, 27 are mounted within crystal holders which are preferably mounted in intimate thermal relation on a fairly massive metal base plate 33 which is connected to a meter 35 for recording the temperature of the crystals. The base plate 33 and crystals are pre-cooled to a temperature of minus 60° centigrade by means of solidified carbon dioxide or other refrigerating means, not shown.

The output circuits of the oscillators 11, 13, 15 are successively connected through switching means 37 to the detector 9. The detector output is suitably filtered and impressed on an audio amplifier 41 which may include additional filtering. The output circuit of the audio amplifier 41 is connected to an electronic frequency meter and rectifier 43. The output of rectifier 43 is impressed through a coupling device 45 on a recording meter 47 which automatically exhibits the frequency deviations of the several test oscillators.

The operation of the foregoing system is essentially as follows: The output currents of the standard oscillator 1 are impressed through the buffer stage 3 on the multi-vibrator 5. The frequency of the standard oscillator may be, by way of example, 150 kilocycles per second. These currents control the operation of the multi-vibrator 5, whose fundamental frequency is selected as 15 kilocycles per second. The multi-vibrator, as is well known, generates not only currents of the fundamental frequency, but currents which include a large number of harmonic frequencies. Thus the output currents include frequencies from the fundamental to the several hundredth harmonic of the fundamental. The currents of this broad band of frequencies are amplified by the broad band amplifier 7 and impressed on the detector 9.

Preparatory to graphically exhibiting or recording the charasteristics of the crystals 23, 25, 27, these elements, which are suitably housed, are mounted on the base plate 33 and pre-cooled to a temperature of minus 60° centigrade. The crystals and plate are then placed in the oven and respectively connected to the test oscillators 11, 13, 15 and the temperature recording meter 35. When the temperature of the plate reaches minus 50°, the recording meters 17, 19, 21, 35, 47 are started. The oven temperature is then gradually raised so that, after about one hour, the plate and crystals reach a temperature of about 50° centigrade. These temperatures are the extremes at which piezo-electric crystals ordinarily operate in practice, and exceed the ordinary limits at which those skilled in the art have previously tested crystals.

As the oven becomes gradually warmer, the temperatures of the plate 33 and the crystals mounted thereon are recorded by the meter 35. The several test oscillators are successively connected for about a minute to the detector 9 by the switch means 37 which is automatically operated by clockwork, electronic switching means, or the like. During the periods of connection, the currents from each oscillator successively beat with the currents from the broad band amplifier. Since the later currents are very rich in harmonics (the first to the four hundredth harmonic are used), one of the beat frequency currents will fall within the audio frequency range.

The audio frequency currents are passed by the filter 39, but currents of the fundamental multi-vibrator frequency and higher frequency ranges are rejected. The audio frequency currents are amplified and further filtered. These amplified filtered audio frequency currents operate the electronic frequency meter 43 to provide a visible indication of their frequency. The audio currents are rectified and impressed on the coupling device. The function of the coupling device is to convert the unidirectional impulses from the rectifier to currents which are impressed on the thermal junction of the graphic recording meter. One recording meter which we have found suitable is essentially the same as the temperature recording meter 35 which is readily adapted to record the currents derived from the coupling means 45.

Since the base or zero line of the recording meter 47 represents zero beat currents, and since the deflections are made proportional to the beat frequency, it will be apparent that the graph (see Fig. 2) will successively mark the departure from the standard frequency in cycles per second of the several test oscillators. Because of the use of a single meter for frequency recording, it is necessary to note on the graph the successive starting points of the several test oscillators. Thereafter these points may be readily determined because they are recorded in succession. The flat or interrupted portions of the curve indicate the relative frequency departures from the standard. A curve or graph may be readily traced through these points to indicate the frequency deviation of each crystal throughout the hour run. A graph such as No. 2 indicates that the audio beat of test oscillator No. 2 has gone from one side of the zero line through zero beat to an audio beat on the other side of the zero line.

These graphs, Nos. 1, 2 and 3, are reproduced from actual curves taken of piezo-electric crystals which were ground to oscillate, respectively, at 3645, 3915, and 3645 kilocycles per second. The total deviation of oscillator No. 1 is from 975 cycles to approximately zero cycles per second; No. 2 is from 600 cycles through zero to 100 cycles; and No. 3 is from zero cycles to 460 cycles. These frequency deviations correspond to a temperature change of minus 50° to plus 50° centigrade, as shown by the temperature curve of Fig. 3. Since the rate of movement of the recording paper is made substantially the same, and since the rate of change of the temperature is substantially uniform over a substantial number of runs, the arbitrary time scale, 0–60 minutes, of Fig. 2 may be converted to temperature in degrees centigrade, printed on the recording paper, or the exact temperature for any instant within the sixty minutes may be determined from Fig. 3.

Concurrent with the recording of temperature and frequency deviation, the rectified grid currents of the test crystal oscillators are recorded by the recording milliammeters 17, 19, 21. These recorded currents are respectively reproduced in graphs, Figs. 4A, 4B and 4C. It is desirable to know the oscillator currents because an excessively rapid change or an extremely small current indicates a poor crystal. Since the current indicators operate over the same period as the frequency and temperature recorders, the current indications may be plotted as a function of temperature or frequency, as may be desired. However, the interest is generally with respect to over-all performance which may be determined directly from the several curves.

Inasmuch as our invention does not, in general, lie in the several separate elements, no attempt is made to describe in detail those elements which are either well known to those skilled in the art or which are commercially available. For example, the recording meters 17, 19, 21 may be any type of recording milliammeter such as the "Bristol Recording Milliammeter." The temperature recording meter 35 may be a "Bristol Potentiometer Pyrometer, Model No. 427" which is adjusted to cover from minus 50° to plus 50° centigrade. The frequency recording meter 47 may be of the same type as the temperature recording meter 35, with connections from the coupling device 45 to the thermocouple leads.

The multi-vibrator 5 may be constructed according to arrangements well known to those skilled in the art, or may be a "General Radio Multivibrator Type 692A", which, although designed for 10 kilocycle operation, may be suitably altered or adjusted to operate at 15 kilocycles. The electronic frequency meter and rectifier may be likewise constructed or may be a "General Radio Electronic Frequency Meter, Type 834A". The switching means 37 may be an electronically operated switch, or a commutator switching device may be connected to a clockwork, synchronous motor or the like.

While our invention is not limited to any particular test oscillator circuit, we prefer a circuit which is least affected by ambient temperature changes, and which will automatically oscillate over a wide frequency range without requiring any manual tuning. Such an oscillator circuit is shown in Fig. 5. The thermionic tube 51 oscillates over a wide range of frequencies and the particular frequency is determined or controlled by the piezo-electric element 53 which is connected between grid and anode.

It is essential that the test oscillator oscillate at a constant frequency and be unaffected by slight changes in ambient temperature and the like. We have found that it is highly desirable to prevent the multivibrator currents from reacting on the standard oscillator currents, and to this end recommend a buffer stage. One suitable circuit arrangement is illustrated in Fig. 6. The standard crystal 55 is one having a very low coefficient of temperature, and means for controlling the temperature. The crystal 55 is connected to a thermionic oscillator 57, whose output is impressed through the buffer stage 59 on the multivibrator input. It is desirable to match the output of the buffer stage to the input of the multi-vibrator 5 by a resistor 61.

The circuits for the detector 9, filter 39 and audio amplifier 41 are illustrated in Fig. 7. The thermionic tube 63 is adjusted for modulation or detection. The inputs from the broad band amplifier 7 and from the switch means 37 are preferably impressed on separate control grids. A low pass filter, comprising capacitors 65, 67 and inductor 69, is aranged to reject the higher frequency currents, in particular the 15 kilocycle currents, and pass the lower or audio frequency currents. The audio amplifier, comprising tubes 71, 73, is connected to the output of the low pass filter 65, 67, 69. The amplifier circuit includes a band rejector filter comprising inductor 75 and capacitors 77, 79. This filter 75, 77, 79 is adjusted to reject currents of the band frequencies just above and just below 15 kilocycles.

The broad band amplifier 7 is designed to give a gain of the order of one thousand over a frequency range of approximately 2 to 6 megacycles. The circuit diagram of Fig. 8 represents one embodiment of a broad band amplifier which has proven satisfactory. It will be observed that two channels are used in parallel to insure substantialy uniform gain. One channel comprises thermionic tubes 81, 83, 85 and associated transformers 87, 89, 91. The transformers include shunting resitors and suitable adjustable iron cores. The second channel includes thermionic tubes 93, 95, 97 and transformers 99, 101, 103. The primary windings are shunted with resitors and tuned by adjustable iron cores; the secondary windings are also tuned by adjustable iron cores. These adjustable iron cores may include any of the several materials which are commercially available and suitable at the frequencies specified above.

A coupling circuit, shown in Fig. 9, is used to convert the output of the rectifier into suitable currents for operating the recording meter 47. This coupling circuit includes an adjustable shunt resistor 105 and an adjustable series resistor 107 across which is impressed a voltage from a battery 109. The purpose of this voltage is to impress on the leads to the thermocouple of the recording meter 47 an initial voltage which will move the indicator to zero. This is ordinarily necessary because the temperature recording meters which we have recommended are adjusted to give mid-scale indication at voltages corresponding to normal room temperature, and we prefer to have the zero scale indication at the zero beat or zero audio voltage.

Thus we have described the aparatus for and the method of automatically exhibiting the frequency characteristic of a piezo-electric element as a function of temperature. The oscillatory currents from several test oscillators and from a multivibrator, controlled by a standard oscillator, are impressed on a detector. Beat frequency currents are thereby created. The audio beat currents are selected, amplified, and rectified. The rectified currents establish voltages proportional to the deviation in frequency. These voltages operate a graphic recording device, which automatically plots a graph of the deviation in frequency. The piezo-electric elements are operated at temperatures from minus 50° to plus 50° centigrade. These temperatures are also automatically recorded. The rectified grid currents of the piezo-electric oscillators are likewise recorded.

The circuits and constants specified are given by way of example, and not by way of limitation. While the frequency of the standard oscillator is given as 150 kilocycles and the multivibrator as 15 kilocycles, it should be understood that other frequencies, such as 100 kilocycles and 10 kilocycles, may be respectively used. Likewise, the oscillator, amplifier, detector and filter circuits may be modified without departing from the spirit of our invention. While the foregoing method does not indicate whether the coefficient of temperature of a piezo-electric crystal is positive or negative, and while ordinarily the user is only interested in deviation of frequency as a function of temperature, the sign of the coefficient of temperature may be determined by a separate observation. For example, the standard oscillator may be equipped with a capacitor which may be included at will in shunt to the standard crystal. The shunt capacitor decreases the frequency of the standard crystal and thereby indicates whether the test crystal is increasing or decreasing with changes in temperature with respect to the standard.

We claim as our invention:

1. The method of exhibiting the frequency deviation of a piezo-electric element as a function of temperature which comprises generating currents of a standard frequency and harmonics thereof, generating currents from a piezo-electric crystal, subjecting said crystal to a range of ambient temperatures, mixing said generated currents, deriving an audio frequency current from said mixing, converting said audio frequency current to a uni-directional current, deriving voltages from said uni-directional currents, and automatically and graphically plotting said voltages.

2. The method of exhibiting the frequency characteristics of a piezo-electric element as a function of temperature which comprises generating currents of a standard frequency, controlling the generation of currents of a plurality of frequencies which are harmonically related to said standard, generating a current of a frequency determined by said piezo-electric element, mixing said generated currents to form beat frequency currents, deriving an audio frequency current from said beat frequency currents, converting said audio frequency current into a uni-directional current, deriving voltages from said uni-directional current, varying the temperature of said piezo-electric element, automatically recording said temperature, and automatically and graphically exhibiting the deviation in frequency of said element due to said temperature variation by deflections which are proportional to said derived voltages.

3. The method of exhibiting the frequency characteristics of a plurality of piezo-electric elements as a function of temperature which comprises generating currents of a standard frequency and harmonics thereof, generating currents of frequencies which are respectively controlled by said elements, successively mixing the currents controlled by said elements with said standard and harmonic frequency currents, deriving an audio frequency current from said mixed currents, converting said audio frequency currents into uni-directional currents, deriving voltages from said uni-directional currents, automatically and graphically successively recording said voltages, varying the temperature of said elements, recording said variation and simultaneously and successively graphically plotting the voltages derived from said elements and corresponding to said variations in temperature.

4. The method of exhibiting the frequency characteristics of a piezo-electric crystal oscillator as a function of temperature which comprises generating oscillatory currents of a standard frequency, generating currents of a fundamental frequency and a plurality of different frequencies harmonically related to said fundamental and controlled by currents of said standard frequency, generating oscillatory currents of a frequency dependent on said piezo-electric crystal, detecting said second mentioned currents and said last mentioned oscillatory currents to thereby generate beat frequency currents, deriving audio frequency currents from said beat frequency currents, rectifying said audi frequency currents, applying said rectified currents to actuate automatic recording means, varying the temperature of said piezo-electric crystal, recording said temperature, and simultaneously plotting said rectified currents to thereby graphically show the frequency deviation of said piezo-electric crystal as a function of temperature.

5. The method of graphically exhibiting the frequency characteristics of a piezo-electric crystal oscillator as a function of temperature which comprises generating oscillatory currents of a standard frequency, generating currents of a fundamental frequency and a plurality of different frequencies harmonically related to said fundamental and controlled by said standard frequency currents, amplifying said last mentioned currents, generating oscillatory currents of a frequency dependent on said piezo-electric crystal, detecting said second mentioned currents and said last mentioned oscillatory currents to thereby generate beat frequency currents, deriving audio frequency currents from said beat frequency currents, amplifying said audio frequency currents, rectifying said amplified currents, applying said rectified currents to actuate automatic recording means, varying the temperature of said piezo-electric crystal, recording said temperature, and simultaneously plotting said rectified currents to thereby graphically show the frequency deviation of said piezo-electric crystal as a function of temperature.

6. The method described by claim 4 in which a plurality of piezo-electric crystal oscillators are calibrated for deviation in frequency as a function of temperature, by the additional steps of successively detecting the separate oscillatory currents respectively controlled by said piezo-electric crystal, and simultaneously varying the temperature of said plurality of piezo-electric crystals.

7. The method described by claim 4 and the additional step of rectifying and recording the amplitude of said oscillatory currents of a frequency dependent on said piezo-electric crystal concurrently with said temperature variation.

8. In apparatus of the character described, the combination of a standard oscillator, a generator of fundamental and harmonic currents controlled by currents from said standard oscillator, a test oscillator, a piezo-electric crystal, means connecting said crystal to said test oscillator for thereby controlling the frequency of currents generated by said test oscillator, a detector, means for impressing currents from said first mentioned generator and said test oscillator on said detector, means for deriving audio frequency currents from said detector, means for rectifying said audio frequency currents, means for impressing said rectified currents on an exhibiting means whereby a graph is made which is proportional to the frequency deviation of said crystal, and an oven including a plate for supporting said crystal in intimate thermal relation, and means for varying the temperature of said plate and crystal.

9. In an apparatus of the character of claim 8, means for recording said variation in temperature.

10. In an apparatus of the character of claim 8, means for recording said variation in temperature, and means for recording variations in the amplitude of currents generated by said test oscillator.

WILLIAM F. DIEHL.
HERBERT A. CLARKE.